(No Model.)

J. W. FINCH.
MONOCYCLE.

No. 521,786.  Patented June 26, 1894.

Witnesses:
J. D. Garfield
K. I. Clemons

Inventor,
John W. Finch
per Chapin & Co.
Attys.

UNITED STATES PATENT OFFICE.

JOHN W. FINCH, OF NORTHAMPTON, MASSACHUSETTS.

MONOCYCLE.

SPECIFICATION forming part of Letters Patent No. 521,786, dated June 26, 1894.

Application filed May 31, 1893. Serial No. 476,083. (No model.)

*To all whom it may concern:*

Be it known that I, JOHN W. FINCH, a citizen of the United States, residing at Northampton, in the county of Hampshire and State of Massachusetts, have invented new and useful Improvements in Monocycles, of which the following is a specification.

The object of this invention is to improve the construction of that class of velocipedes embodying a continuous circular track or rim in which is mounted a wheeled frame for the rider, and which is pedal driven by the rider.

The improvements relate to the construction of the inner machine with reference to its engagement within, and guidance by, the great wheel or endless track.

The invention consists in the construction and combination of parts, all substantially as will hereinafter fully appear and be set forth in the claim.

Reference is to be had to the accompanying drawings, in which—

Figure 1:
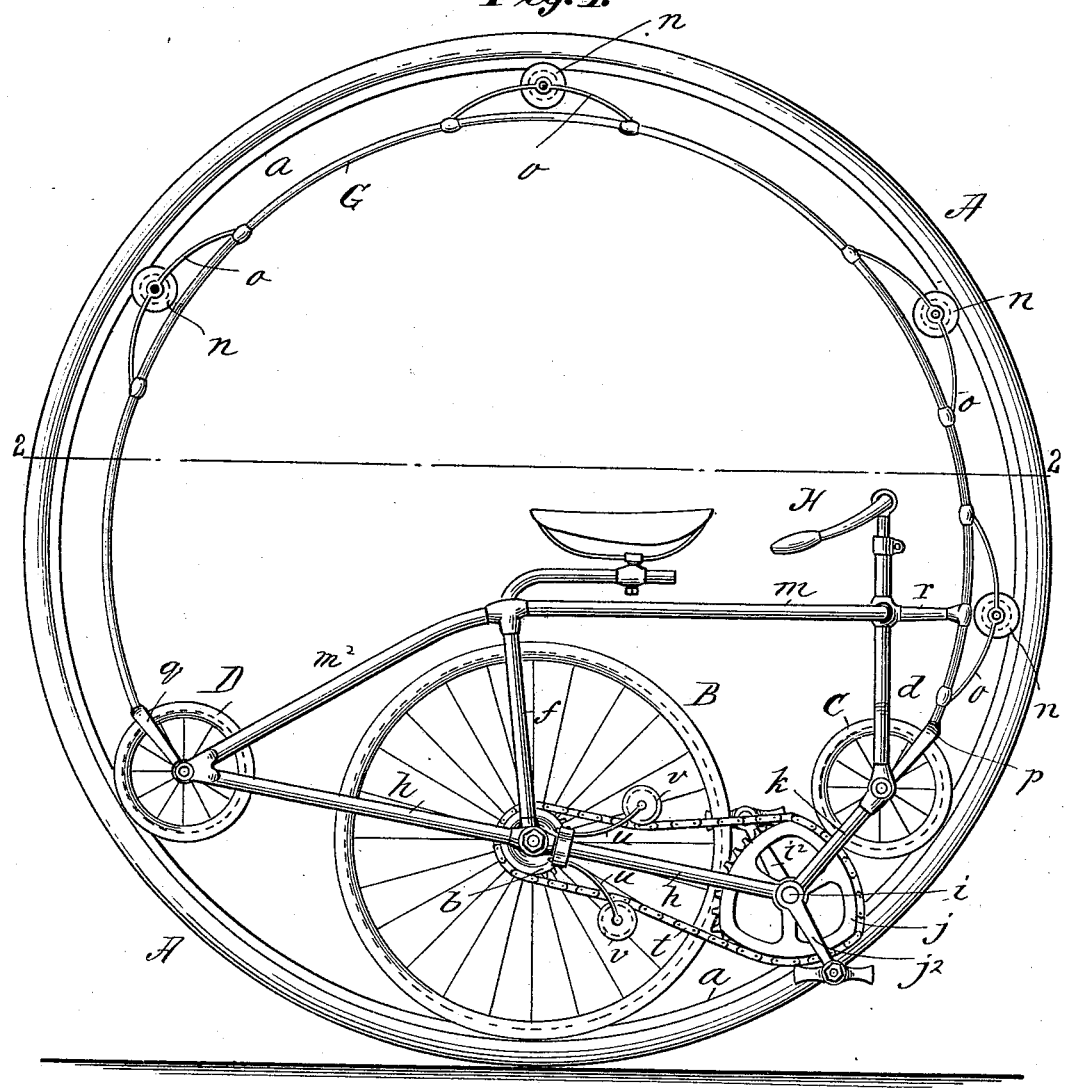
Figure 2:
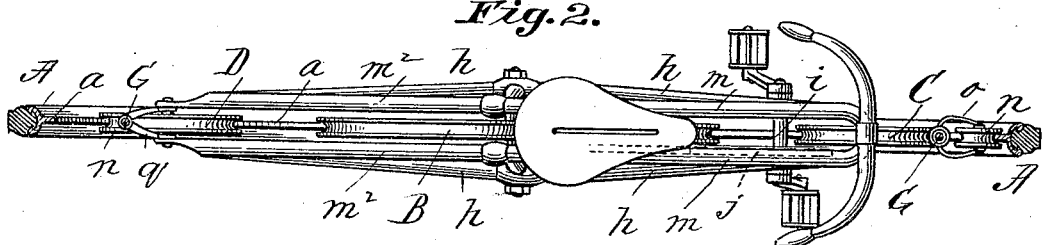

Figure 1 is a side elevation of the improved vehicle. Fig. 2 is a plan view, as seen below the plane, indicated by line 2—2, Fig. 1.

The great wheel, A, may be of any suitable construction and has the internal flanged track, $a$, and may have a pneumatic or other form of tire, as manifest. Within this annular track is a velocipede to run thereon, which will be now described in detail.

The velocipede comprises the main and driven grooved wheel, B, with the sprocket wheel, $b$, affixed thereto, and the forward and rear smaller grooved wheels, C and D, the upright forks, $d, f$, at the lower ends of which are the bearings for the said wheels, C and D, the opposite or duplicated lower side members, $h, h$, which extend from the rear wheel past the bearings for the said wheel, B, in advance thereof, and have the crank-shaft, $i$, and sprocket-wheel, $j$, at said extended portions. There are also forward and upwardly extended opposing continuations, $k$, which are united to the fork at the bearing for the forward wheel. The inner machine, furthermore, comprises the upper duplicated frame members, $m, m$, which extend from the forward upright fork, $d$, to the upright fork, $f$; and the duplicated rear and downwardly extended frame members, $m^2$, which extend from the said upright fork to the rear wheel bearing. The frame for the inner machine also has the bowed formed arching brace, G, which has connections at the front and rear of the said described frame, and extends around within the upper portion of the great wheel in proximity thereto and carries the small grooved wheels or rollers, $n, n, n, n$, which have free running engagements with the aforesaid inner track. Each of these wheels, $n$, is supported from the arc-brace, G, by duplicated bowed brackets, or carriers, $o$. The arc-brace, as indicated, has forked extremities, $p, q$, which are rigidly connected to the frame adjacent the bearings for the front and rear wheels, C, D. The horizontal brace, $r$, also extends from the upper part of the fork, $d$, to a rigid connection with the arc-brace, G, above the fork, $p$, and serves to hold the arc-brace against lateral deflection relative to the inner velocipede of which it is in one sense a part. The handle-bars, H, are provided at the upward extension of the front fork, $d$, while the saddle, J, is mounted on a frame over the wheel, B. I have provided the spring-arms, $u$, which carry at their free ends the chain-tensioning rollers, $v, v$, said arms being suitably connected to the frame, as indicated.

Having thus described my invention, what I claim, and desire to secure by Letters Patent, is—

In a velocipede, the combination with the great wheel, A, with the internal track-flange, $a$, of the grooved wheel, B, and the forward and rearward grooved wheels, C, D, all running peripherally on said track-flange, and said wheel, B, having a sprocket wheel thereon, the upright forks, $d$, and $f$, for wheels, B, C, the paired side members, $h, h$, running from the said rear wheel to and in advance of the wheel, B, forming the bearings therefor and supporting in advance thereof a sprocket-wheel and pedal crank, the forwardly and upwardly extended members, $k$, $k$, having connection with the said fork, $d$, and members, $h$, the upper frame members, $m$ and $m^2$, the chain and the brace, G, arching the frame and having the fork extremities which are connected to the bearing support of the front and rear wheels, C and D, and the forward brace, r, connecting the head frame of the machine and said brace, G, above the front brace-fork, and the grooved rolls, n, n, supported by said arching brace and running internally upon the great wheel track, substantially as described and shown.

JOHN W. FINCH.

Witnesses:
 WM. S. BELLOWS,
 K. I. CLEMONS.